3,110,618
METHOD OF APPLYING PLASTIC COATINGS TO SUBSTRATES
Joseph Y. Resnick, Diane Drive, Ellenville, N.Y.
No Drawing. Filed May 18, 1960, Ser. No. 29,821
1 Claim. (Cl. 117—161)

This invention relates to a method of coating substrates with plastics. More particularly, the invention relates to a method of applying a plastic coating to such substrates as paper, paper products, metal foils and other sheet materials. The invention is not limited to any specific class of plastic materials but it is directed mainly to thermoplastics such as acrylic and styrene resins.

The conventional method of applying a plastic coating of this general type to a paper or metal substrate or the like comprises the following steps: A polymerized resin is dissolved in a solvent. The solution is then applied to the substrate. Finally, the solvent is driven off and what is left is the plastic material in the form of a thin film or coating. There are certain definite disadvantages in this procedure. For example, over and above the cost of the plastic material itself is the added cost for the solvent. The solvent does not improve the final result and indeed may even detract from it but it is used because no other method of applying the plastics has heretofore been developed. Another disadvantage resides in the limited proportion or concentration of resin solids in the solution. This limitation is reflected in the difficulty of achieving a relatively thick coat or film of plastic material on a substrate of the character under discussion. There is also the problem of penetrating the surface of the substrate and its fibrous structure, as in the case of a paper or other fibrous material. Another problem resides in the adverse effect which the solvent itself might have upon the material of which the substrate is made. There are other disadvantages in this conventional method of applying a plastic coating to a subtrate.

The object of this invention is the provision of a plastic coating method which eliminates all of these disadvantages and provides very significant advantages of its own. More specifically, the present invention is predicated upon the use of a plastic material prior to its polymerization. The starting point is a partially polymerized monomer. This material is applied to the substrate and it is then completely polymerized. The result is a superior plastic coating or film which is securely anchored to the substrate.

It will be understood from the foregoing that what the present invention achieves is the elimination of a step and a material which are deemed essential in the application of plastic coatings or films to substrates of the character described. The conventional method also starts with a monomer and the monomer is then polymerized and of course it passes through the stage of partial polymerization before it is fully polymerized. But no advantage is taken of this procedure in the conventional method of applying plastic coatings to substrates. Instead, after the monomer is completely polymerized it is dissolved to a coating consistency. After it is coated upon the substrate the solvent is removed and the plastic material is once again reduced to a solid state.

In the present invention advantage is taken of the fact that when a monomer of the type under discussion is partially polymerized it is of a consistency suited for coating upon a substrate. It is only after the coating operation is finished that the plastic material is completely polymerized. There is therefore no need to dissolve the material in order to coat it upon a substrate.

More particularly, the present invention is concerned with such plastic materials as acrylic and styrene resins but it will be understood that the invention is not intended to be limited thereto. The same method will apply to other plastic materials suitable for use as coatings or films upon sheet material substrates such as paper or aluminum, copper, brass or steel foil. Illustrative of the acrylic resins which may be used in connection with the present invention are methylmethacrylates which are sold under the trademarks Lucite and Plexiglas by E. I. du Pont de Nemours & Co., of Wilmington, Delaware, and Rohm & Haas Company, of Philadelphia, Pennsylvania, respectively. Illustrative of the styrenes are Dylene, made by Koppers Co., Inc., of Pittsburgh, Pennsylvania, and Styron made by The Dow Chemical Company, of Midland, Michigan.

The first step in the present process is to partially polymerize the monomer until it becomes a viscous gel. This may be done by conventional means and methods, for example, a monomer methylmethacrylate can be partially polymerized by heating with a catalyst such as benzoyl peroxide. The partially polymerized material is then coated on the substrate by any suitable means and methods such as roller coating, knife coating or spraying. The substrate with its coating of partially polymerized resin is then heated until polymerization is completed. In a typical case the material is heated at approximately 200 degrees Fahrenheit for approximately 30 seconds and the process is finished.

Starting with a styrene monomer instead of an acrylic monomer above-mentioned, the foregoing procedure is repeated. The styrene is partially polymerized by any conventional means and method such as heat, peroxide, free-radical forming catalyst or ionic- or acid-acting catalysts of the Friedel-Crafts type. The material is polymerized until it becomes a viscous gel and it is then coated upon the substrate. It is then heated at approximately 200 degrees Fahenheit for approximately 30 seconds and polymerization is thereby completed. Once this happens, the coating job is done.

The degree of viscosity of the partially polymerized resin is determined by various factors. By way of illustration, when it is desired to cause deep penetration of the resin into the substrata, a less viscous consistency is required. Thus, a relatively low viscosity factor would be appropriate in the application of a thin resin coating or film to a paper or other fibrous substrate. The pores and fibers of the substrate would be penetrated by such low viscosity material and the coating or film would thereby firmly be anchored to the substrate. On the other hand, should it be desired to apply a relatively thick or heavy coating to a substrate, a high viscosity, partially polymerized resin would be utilized. Illustrative would be the application of a thick plastic coating to a metal foil. A high viscous material would also be appropriate in connection with a fibrous substrate where it is desired to avoid penetration of the pores and fibers thereof with said plastic material.

It will be understood that the present invention may be applied not only to one side of a substrate but to both sides. This may be done simultaneously or it may be done separately, as for example where it is desired to apply one kind of resin to one surface thereof and another kind to the opposite surface. It should also be understood that various coloring materials and dyes may be added to the monomer, prior to polymerization, in order to effectively color the substrate. Other variations in the treatment are also contemplated within the scope of the invention.

The foregoing is illustrative of a preferred form of this invention and it will be understood that said form of the invention may be modified and modifications in the materials, temperatures and procedures mentioned may be had within the broad principles of the invention and the broad scope of the claim.

I claim:

A method of applying plastic coatings to sheet material substrates, comprising the steps of heating and partially polymerizing a solvent-free monomer selected from the group consisting of acrylic and styrene resin monomers until it becomes a viscous gel of a consistency suitable for coating a sheet material substrate, coating said viscous gel on such substrate, and then completing polymerization of said monomer on such substrate by heating the monomer to a temperature of approximately 200° F' for about 30 seconds.

References Cited in the file of this patent

UNITED STATES PATENTS

| | | |
|---|---|---|
| 2,450,503 | Drummond | Oct. 5, 1948 |
| 2,463,551 | Myerson et al. | Mar. 8, 1949 |